United States Patent [19]
Jain et al.

[11] Patent Number: 6,097,614
[45] Date of Patent: Aug. 1, 2000

[54] ASYMMETRICAL PULSE WIDTH MODULATED RESONANT DC-DC CONVERTER WITH COMPENSATING CIRCUITRY

[75] Inventors: Praveen Jain; Yan-Fei Liu, both of Kanata; Simmi Mangat, Bai d'urfe, all of Canada

[73] Assignee: Astec International Limited, The Hong Kong Special Administrative Region of the People's Republic of China

[21] Appl. No.: 09/312,306

[22] Filed: May 14, 1999

[51] Int. Cl.$^7$ .................................................. H02M 3/335
[52] U.S. Cl. ................................................................ 363/16
[58] Field of Search .................................. 363/15, 16, 95, 363/97, 41

[56] References Cited

U.S. PATENT DOCUMENTS

| | | | |
|---|---|---|---|
| 5,159,541 | 10/1992 | Jain | 363/26 |
| 5,373,432 | 12/1994 | Vollin et al. | 363/16 |
| 5,490,052 | 2/1996 | Yoshida et al. | 363/15 |

OTHER PUBLICATIONS

Aguilar, et al., "An Integrated Battery Charger/Discharger with Power Factor Correction," IEEE Power Electron. Specialists Conf., Jun. 1995, pp. 714–719.
Batarseh, et al. "Steady–State Analysis of the Parallel Resonant Converter with LLCC–Type Commutation Network," IEEE Trans. on Power Electron. 6(3):525–538, Jul. 1991.
Bhat, "Analysis and Design of a Fixed Frequency LCL–Type Series Resonant Converter," Proc. 1992 Appl. Power Electron. Conf., Feb. 1992, pp. 253–260.
Caceres, et al. "A High Performance Uninterruptible Power Supply System with Power Factor Correction," IEEE Power Electron. Specialists Conf., Jun. 1997, pp. 304–309
Jain "Asymmetrical Pulse–Width–Modulated Resonant DC/DC Converter Topologies," IEEE Trans. on Power Electron. 11(3):413–422, May 1996.
Johnson, et al. "Steady–State Analysis and Design of the Parallel Resonant Converter," IEEE Trans. on Power Electron. 3(1):93–104, Jan. 1998
Ma, et al., "An Integrated Flyback Converter for DC Uninterruptible Power Supply," IEEE Power Electron. Specialists Conf., Feb. 1994, pp. 661–666.
Steigerwald "A Comparison of Half–Bridge Resonant Converter Topologies," IEEE Trans. on Power Electron. 3(2):174–182, Apr. 1988.
Tsai, et al. "Constant–Frequency Clamped–Mode Resonant Converters" IEEE Trans. on Power Electron. 3(4):460–473.

*Primary Examiner*—Shawn Riley
*Attorney, Agent, or Firm*—Coudert Brothers

[57] ABSTRACT

An asymmetrical pulse width modulated resonant DC—DC converter exhibiting improved zero voltage switching characteristics is disclosed. The converter includes a chopper circuit to convert the DC input voltage to a high frequency AC voltage which, in turn, is fed to a high frequency transformer whose secondary AC is rectified and filtered to produce a stable DC output. A compensation network is placed between the input and the chopper circuit which provides zero voltage switching of the converter over a wide input voltage range.

5 Claims, 5 Drawing Sheets

ASYMMETRICAL PULSE WIDTH MODULATED RESONANT DC-DC CONVERTER WITH COMPENSATING CIRCUITRY

FIELD OF THE INVENTION

The present invention generally relates to power supplies, and more particularly, to asymmetrical pulse width modulated resonant DC—DC power converters.

BACKGROUND OF THE INVENTION

In order to meet the power requirements of point of use power supplies in telecommunications and computer systems, there is a trend to operate the power supplies of such telecommunication and computer systems at high switching frequencies. As the switching frequencies increase, switching losses associated with the turn-on and turn-off of the devices in the power supplies also increase. In switch mode power supplies, these losses are so significant that the operation of the power supplies at very high frequencies are prohibitive due to low conversion efficiencies.

To overcome such drawbacks, constant frequency resonant converters have been used in telecommunications equipment. Constant frequency resonant converters provide high power density, high efficiency and low switching losses while operating at a constant frequency. Constant frequency resonant converters can also be operated at high frequencies. A drawback associated with high frequency resonant converters is that they have a high component count. This high component count results in lower power densities at low to medium power levels.

Asymmetrical pulse width modulated (APWM) resonant DC—DC converters are used in conjunction with devices having low to medium power level requirements. APWM converters offer near-zero voltage switching (ZVS) losses while operating at constant and very high frequencies. APWM converters have a low component count which makes operation at low to medium power levels feasible. Drawbacks associated with known APWM converters include the fact that the input voltage range over which ZVS occurs is narrow. Also, the efficiency of APWM converters decreases as the input voltage increases. Further, resonant inductor losses increase as the voltage across the resonant inductor increase.

SUMMARY OF THE INVENTION

The aforementioned and related drawbacks associated with conventional DC—DC converters are substantially reduced or eliminated by the modified APWM resonant DC—DC converter of the present invention. The modified APWM converter of the present invention includes a chopper circuit for converting a DC input signal to an AC signal of a high frequency. The chopper circuit includes at least two switches, with the switches being alternately made conducting by respective gate pulse signals applied to the switches, the gate pulse signals having complementary duty cycles. A compensation network, coupled to the chopper circuit, is operative to control the application of the gate pulse signals in response to the DC input signal. A resonant circuit, coupled to the chopper circuit, sends the high frequency AC signal to a transformer, which provides a secondary signal to a rectifier circuit. The rectifier circuit generates a stable DC output signal in response to the secondary signal.

An advantage of the present invention is that the switching losses at high input voltages are substantially reduced or eliminated.

Another advantage of the present invention is that zero voltage switching of a converter can be maintained at both a wide input voltage and a wide load current range.

Still another advantage of the present invention is that high efficiency of the power supply can be maintained over a wide input voltage range.

A feature of the present invention is that the voltage and current stresses on the resonant components are reduced.

Another feature of the present invention is that the converter can be manufactured at low cost.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which.

DETAILED DESCRIPTION OF THE INVENTION

Figure 1:
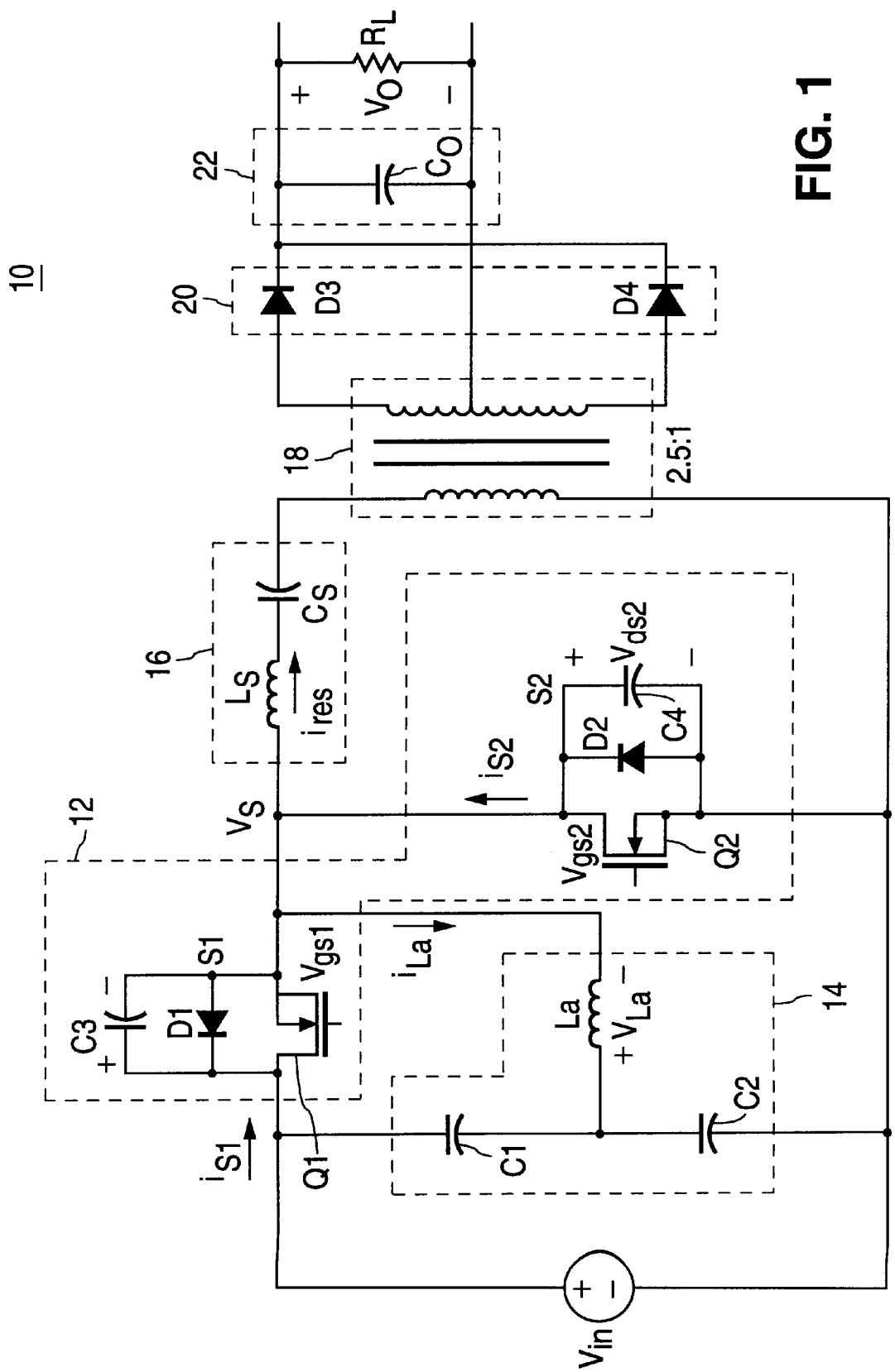
FIG. 1 is a circuit diagram of the asymmetrical pulse width modulated resonant DC—DC converter of the present invention.

The asymmetrical pulse width modulated converter (APWM) of the present invention will now be described with reference to FIGS. 1 through 9. FIG. 1 is a circuit diagram of the APWM converter of the present invention.

In an exemplary embodiment, the converter 10 consists of a chopper circuit 12, a compensation network 14, a resonant circuit 16, a high frequency transformer 18, a rectifying circuit 20 and an output filter 22. The chopper circuit 12 is a half bridge inverter having two switches S1 and S2. Switch S1 is comprised of a MOSFET Q1, having a source, drain and gate, an anti-parallel diode D1 connected in parallel to the MOSFET Q1 and a snubber capacitor C3 which is connected in parallel to diodeD1. A gate pulse signal, $V_{gs1}$, is applied to the gate of MOSFET Q1 to control the conduction of switch S1. Switch S2 is comprised of a MOSFET Q2, having a source, drain and gate, an anti-parallel diode D2 connected in parallel to the MOSFET Q2 and a snubber capacitor C4, which is connected in parallel to diode D2. A gate pulse signal $V_{gs2}$, is applied to the gate of MOSFET Q2 to control the conduction of switch S2.

The gate pulse signals of the converter are complimentary of each other. This means that if the duty cycle for switch S1 is D, then the duty cycle for switch S2 would be (1−D). The function of the chopper circuit 12 is to convert a DC input voltage ($V_{in}$) to a high frequency unidirectional voltage waveform, $V_s$, at its output.

In an alternate embodiment of the present invention, the anti-parallel diodes D1 and D2 are removed from the switches S1 and S2, respectively, as the body diodes of the MOSFETS Q1 and Q2 serve the function of anti-parallel diodes D1 and D2.

The compensation network 14 is comprised of two auxiliary capacitors C1 and C2 and an auxiliary inductor, $L_a$. The auxiliary capacitors C1 and C2 are connected in series and then connected to the input voltage rail before switch S1. Auxiliary inductor $L_a$ is connected between the center point of the two auxiliary capacitors C1 and C2 and the center point of the two MOSFETS Q1 and Q2. The compensation network 14 provides a compensation current to the snubber capacitors C3 and C4 to ensure that zero voltage switching (ZVS) occurs. A conventional feedback network increases the duty cycle of switch S1 if the output voltage, $V_0$, becomes too low and vice versa.

During operation of the converter 10, the voltage across $L_a$ is represented by:

$$V_{La}(t) = \Sigma 1.4\, V_{in}/n\pi \cdot (1-\cos 2\pi nD)^{1/2} \cdot \sin(n\omega_0 t + \delta_n) \quad (1)$$

where D is the duty cycle for switch S1, n is the nth order harmonic, $\omega_0$ is the fundamental switching frequency, and $\delta_n$ is represented by:

$$\delta_n = \tan^{-1}(\cos 2\pi nD - 1/\sin 2\pi nD) \quad (2)$$

This voltage across La will generate an inductor current, $i_{La}$, which is represented by:

$$i_{La}(t) = \Sigma 1.4\, I_s/(n\pi)^2 \cdot D(1-D) \cdot (1-\cos 2\pi nD)^{1/2} \cdot \sin(n\omega_0 t + \delta_n) \quad (3)$$

where n is the nth order harmonic, D is the duty cycle for switch S1, $\omega_0$ is the fundamental switching frequency, and $\delta_n$ is represented by:

$$\delta_n = \tan^{-1}(\cos 2\pi nD - 1/\sin 2\pi nD) \quad (4)$$

This inductor current is used to discharge the snubber capacitor of the switching MOSFET in order to provide for zero voltage switching.

The resonant circuit 16 consists of a series capacitor $C_s$ and a series inductor $L_s$. The function of the capacitor $C_s$ is twofold. First, it blocks the DC component of output voltage of the chopper circuit, $V_s$, from passing to the high frequency transformer 18. Second, it forms a resonant circuit together with inductor $L_s$. The function of the series resonant circuit is to convert the unidirectional voltage $V_s$ into resonant current $i_{res}$. Although the exemplary embodiment uses a series resonant circuit, other resonant circuits such as, for example, a combination of series resonant circuit and parallel resonant circuit can also be used.

The high frequency transformer 18 of the present invention provides matching and isolation for the output voltage $V_o$ of the converter 10. The rectifying circuit 20 of the present invention includes diodes D3 and D4, which converts the resonant current $i_{res}$ into unidirectional current $i_o$ at its output. The output filter 22 of the present invention consists of a capacitor $C_o$. The output filter 22 filters out the high frequency ripple current of $i_o$ and provides an essentially ripple free substantially constant output voltage $V_o$ across the output load $R_L$.

The sizes of the components used in the exemplary embodiment of the converter 10 are provided in Table 1 below.

TABLE 1

| Component | Size |
|---|---|
| C1 | 2.2 μF |
| C2 | 2.2 μF |
| C3 | 2–4 μF |
| C4 | 2–4 μF |
| $L_a$ | 6 μH |
| $L_s$ | 5.5 μH |
| $C_s$ | 22 nF |

The time variation of the output, $V_s$, of the chopper circuit 12 may be represented by the following equation:

$$V_s = V_{in}D + \Sigma 1.4\, V_{in}/(n\pi) \cdot (1-\cos 2\pi nD)^{1/2} \cdot \sin(n\omega_0 t + \Theta_n) \quad (5)$$

where D is the duty cycle for switch S1, n is the nth order harmonic, $V_{in}$ is the input DC voltage, $\omega_0$ is the fundamental switching frequency and $\Theta_n$ is represented by:

$$\Theta_n = \tan^{-1}(\sin 2\pi nD/(1-\cos 2\pi nD)) \quad (6)$$

As explained earlier, $C_s$ blocks the DC component of voltage $V_s$. Therefore, the AC component of $V_s$ which causes the resonant current $i_{res}$, is to flow is given by:

$$V_{sac} = \Sigma 1.4\, V_s/(n\pi) \cdot (1-\cos 2\pi nD)^{1/2} \cdot \sin(n\omega_0 t + \Theta_n) \quad (7)$$

In operation of the converter 10, each of the fundamental and harmonic voltage components, given by equation (7), produces fundamental and harmonic current through the resonant circuit 16. However, to explain the control of the output voltage, $V_o$, of the converter 10 only the fundamental components are considered. This results in the output voltage, $V_o$, of the converter being represented by:

$$V_0 = 0.9\, V_{in}R_L/(Z_{si}\pi) \cdot (1-\cos 2\pi D)^{1/2}$$

$$= K(1-\cos 2\pi D)^{1/2} \quad (8)$$

where $R_L$ is the resistive output load (in ohms) and $Z_{si}$ is the fundamental impedance at the input of the resonant circuit 16 including output load (in ohms). The operating characteristics of the converter 10 will now be described with reference to FIGS. 2 through 9.

Figure 2:
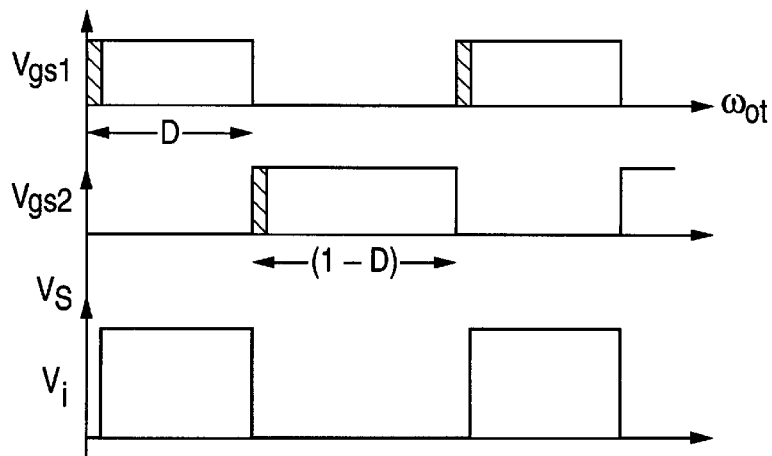
FIG. 2 is a graph illustrating the pulses applied to the switches and the output of the chopper circuit of the present invention.

FIG. 2 is a graph illustrating the gate pulse signals applied to the switches of the converter 10 and the output $V_s$ of the chopper circuit 12 resulting from the application of the gate pulse signals.

Figure 3:
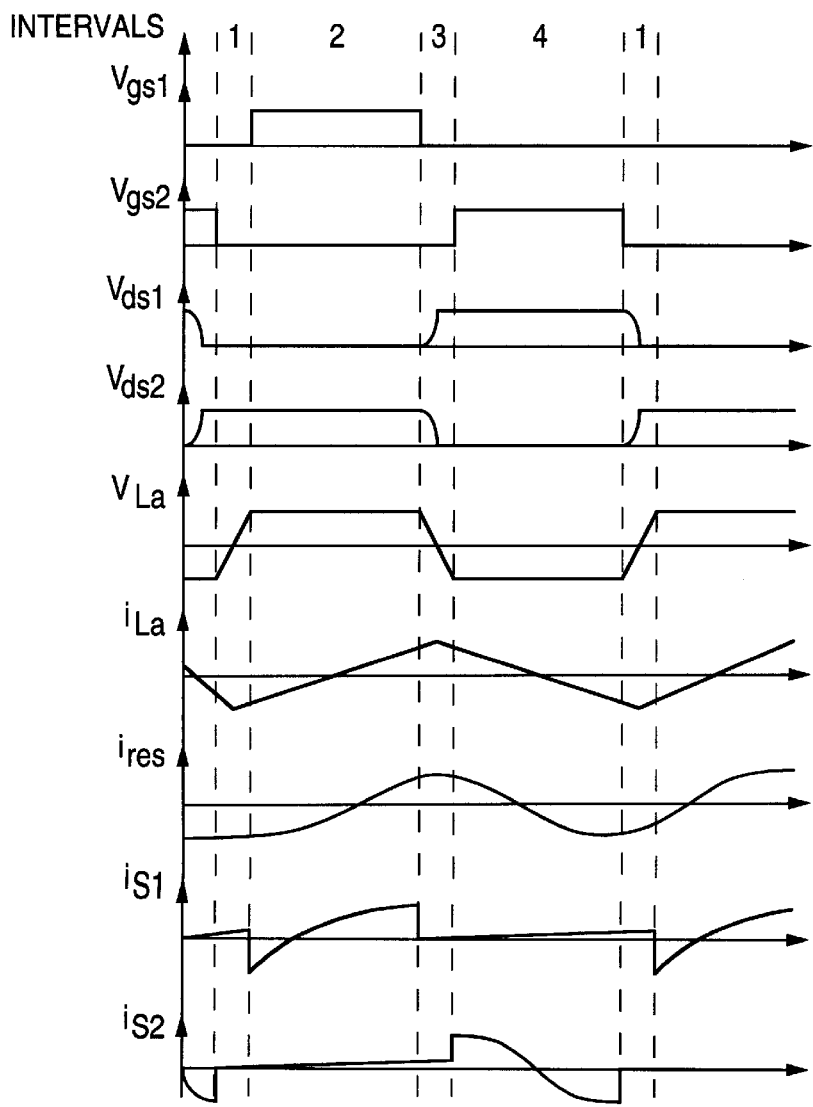
FIG. 3 is a graph illustrating wave forms relating to the operation of the converter illustrated in FIG. 1 in a time domain.

A description of the operation of the converter 10 will now be given with reference to FIG. 3. FIG. 3 is a graph illustrating wave forms relating to various operational parameters of the components of the converter 10 in the time domain. The time domain is segmented into four intervals, labeled 1–4. At the beginning of interval 1, $V_{gs2}$ is removed thereby turning switch S2 off. The current flowing through $L_a$ and the components of the resonant circuit 16 are negative, thus forcing the discharging of C3 and the charging of C4. This charging-discharging process is complementary. More specifically, as C3 discharges from $V_{in}$ to 0, C4 charges from 0 to $V_{in}$. As a consequence of such charging and discharging, at any point in time throughout the cycle, the total charge on both C3 and C4 is $V_{in}$. In order to maintain this total charge, the voltage across $L_a$ given in equation (1) above changes from $-V_2$ to $V_1$, where $V_1$ is the voltage across C1 and $V_2$ is the voltage across C2. Once C3 has fully discharged and C4 has fully charged, the negative currents force the conduction of D1 The voltage across switch S1 is now set at 0 volts.

At the beginning of interval 2, gate pulse signal $V_{gs1}$ is applied across the gate and source of MOSFET Q1. Switch S1 starts to conduct and the current flowing through D1 now flows through, and is carried by switch S1. Since D1 was conducting prior to the conduction of switch S1, turn on of switch S1 is, therefore, obtained under zero voltage. This results in zero turn on losses. During interval 2, the voltage across $L_a$ remains constant at $V_1$. The voltage across switch S2, the output of the chopper circuit 12, is set at $V_{in}$ during this interval as C4 maintains its charge and power flows from the input DC source to the resonant circuit 16 and to the output load $R_L$.

At the beginning of interval 3, gate pulse signal $V_{gs1}$ from the gate of MOSFET Q1 is removed. Switch S1 starts to turn off causing a negative current to flow through $L_a$ and the resonant circuit 16. This negative current flow causes C3, across switch S1, to charge and C4, across switch S2, to discharge to the resonant circuit 16. The voltage across $L_a$ changes from $V_1$ to $-V_2$, causing C3 to charge and C4 to discharge. Once C3 has fully charged and the output voltage across C4 reaches 0, the positive resonant current ($i_{res}$) forces D2 to conduct. The voltage across switch S2 is now set at 0 volts.

At the beginning of interval 4, gate pulse signal $V_{gs2}$ is applied across the gate and source of MOSFET Q2. Switch S2 starts to conduct and the current previously flowing through D2 now flows through switch S2. Since D2 was conducting prior to the conduction of switch S2, the turn on of switch S2 is obtained under zero voltage. This results in zero turn on losses. During interval 4, the voltage across $L_a$ remains constant at $-V_2$. The voltage is set to 0 volts during this interval since C4 maintains its charge of 0 volts. During this interval, to maintain a constant supply of power to the output load, $R_L$, the energy previously stored in the resonant circuit 16 during interval 2 now flows through switch S2.

The operating description of the APWM converter 10 of the present invention shows that the switches S1 and S2 are always turned on turned off under zero voltage, thereby, eliminating switching losses. Further, the snubber capacitors C3 and C4 of switches S1 and S2, respectively, always discharge to the resonant circuit 16, which also eliminates losses in the snubber capacitors.

Figure 4:
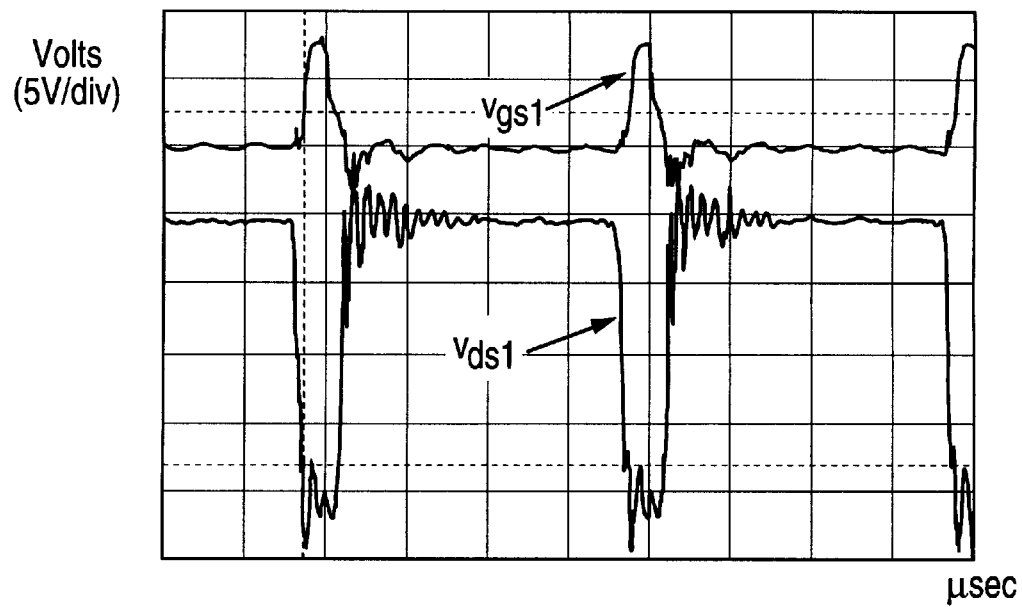
FIG. 4 is a graph illustrating the effect of zero voltage switching at the turn-on of switch S1 of the converter illustrated in FIG. 1.

The inventors performed experiments to verify that the APWM converter 10 achieved zero voltage switching at higher input voltages. FIG. 4 shows the effects of zero voltage switching at the turn on of switch S1. The top trace shows the gate signal, $V_{gs1}$, while the bottom trace shows the drain to source voltage. The input voltage, $V_{in}$, was set at 80 V at full load. The dotted vertical line shows that the drain to source voltage reaches zero volts before the gate pulse signal is applied. Thus, zero voltage switching at the higher input voltage is performed.

Figure 5:
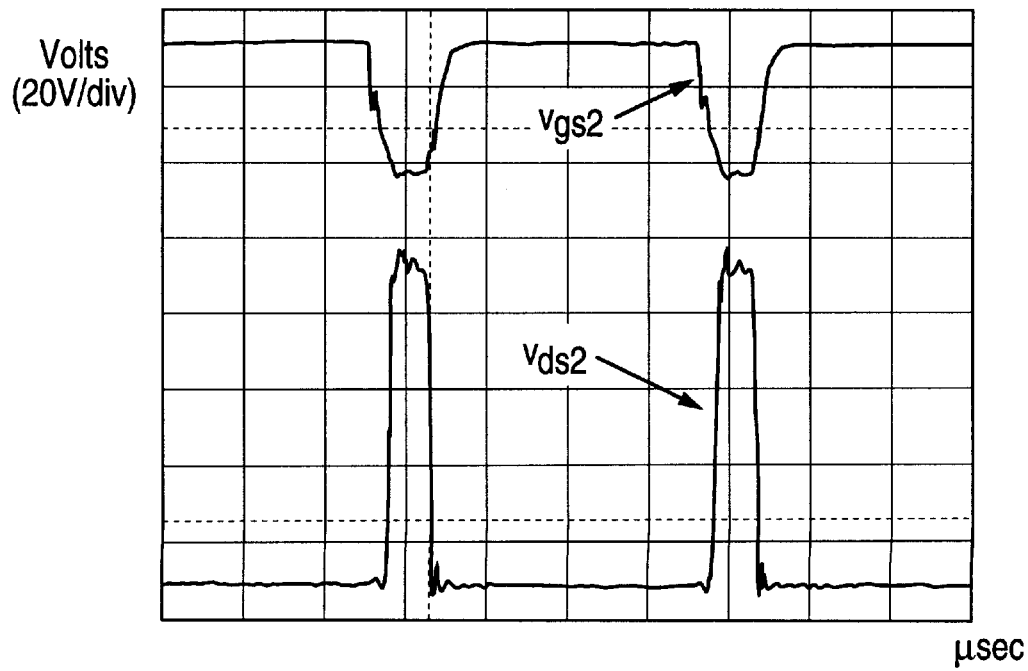
FIG. 5 is a graph illustrating the effect of zero voltage switching at the turn-on of switch S2 of the converter illustrated in FIG. 1.

FIG. 5 shows the effects of zero voltage switching at the turn on of switch S2. The top trace shows the gate signal $V_{gs2}$, while the bottom trace shows the drain to source voltage. The input voltage, $V_{in}$, was set at 80 V at full load. The dotted vertical line shows that the drain to source voltage reaches zero volts before the gate pulse signal is applied. Thus, zero voltage switching at the higher input voltage is performed.

Figure 6:
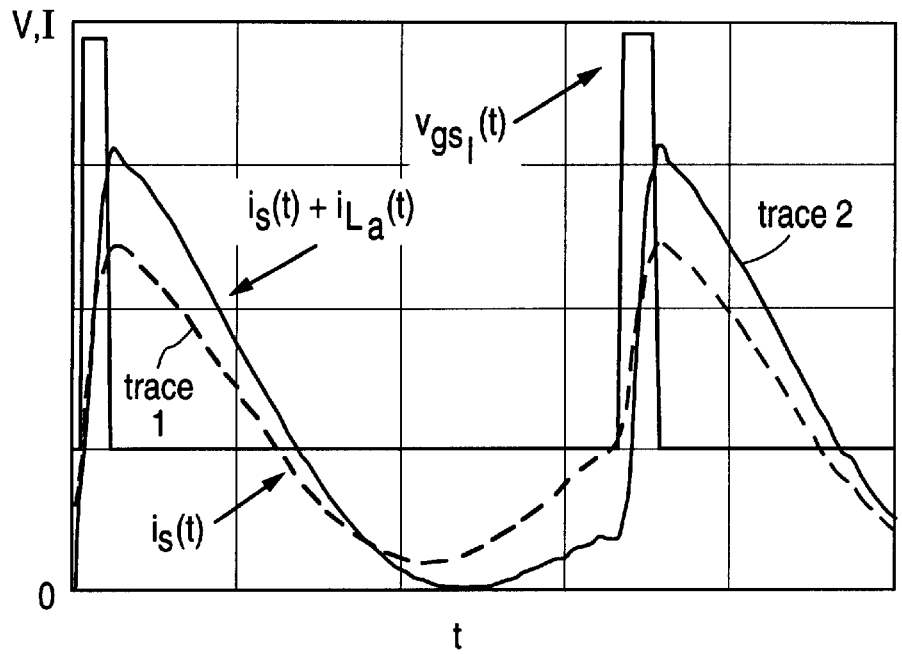
FIG. 6 is a graph comparing the zero voltage switching characteristics of a conventional asymmetrical pulse width modulated converter and the converter of the present invention.

The performance of the APWM converter 10 of the present invention and a conventional APWM converter were compared in conjunction with the application of higher level input voltages. FIG. 6 is a graph illustrating a comparison of the zero voltage switching characteristics of a conventional asymmetrical pulse width modulated converter (trace 1) and the APWM converter of the present invention (trace 2). As illustrated in trace 1, with an input of 80 volts, the conventional asymmetrical converter does not exhibit zero voltage switching. This is a the result of an insufficient amount of negative current being present in the conventional converter to discharge the snubber capacitor of the chopper circuit. In contrast, trace 2 illustrates that the APWM converter 10 of the present invention does achieve zero voltage switching. The current through the compensation network, $i_{La}$, acts as a compensation for the resonant circuit 16 when the input voltage increases. This compensation current provides enough current in order to cause C3 to dully discharge, thereby, achieving zero voltage switching.

Figure 7:
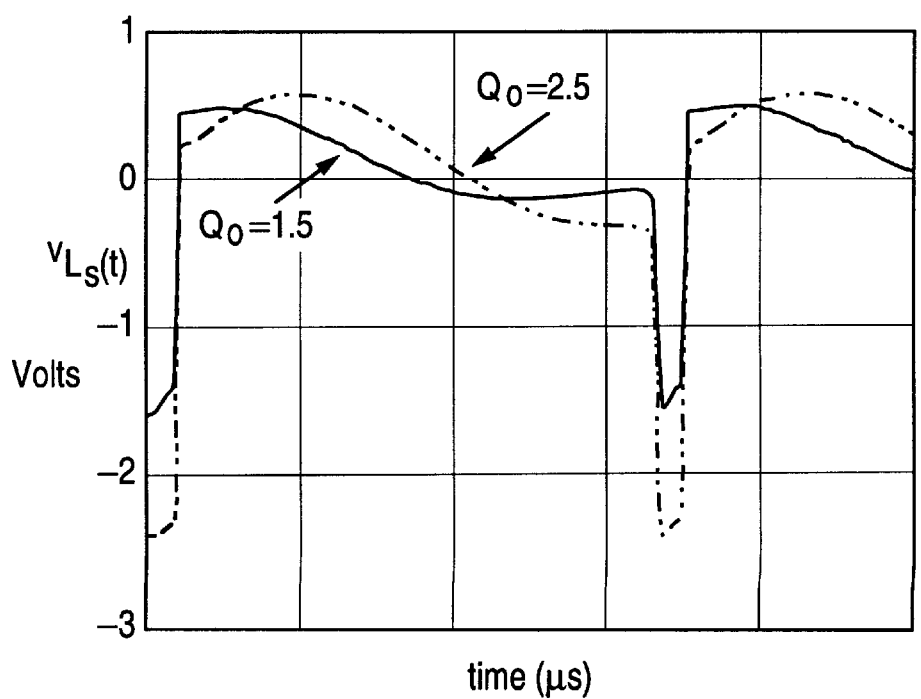
FIG. 7 is a graph illustrating voltage versus time of the resonant circuit of the converter illustrated in FIG. 1.

FIG. 7 is a graph illustrating voltage versus time of the resonant circuit 16. As seen in FIG. 7, the converter of the present invention exhibits a significant reduction of core losses from the resonant converter. This reduction in core losses will make the resonant inductor, $L_s$, much easier to manufacture.

Figure 8:
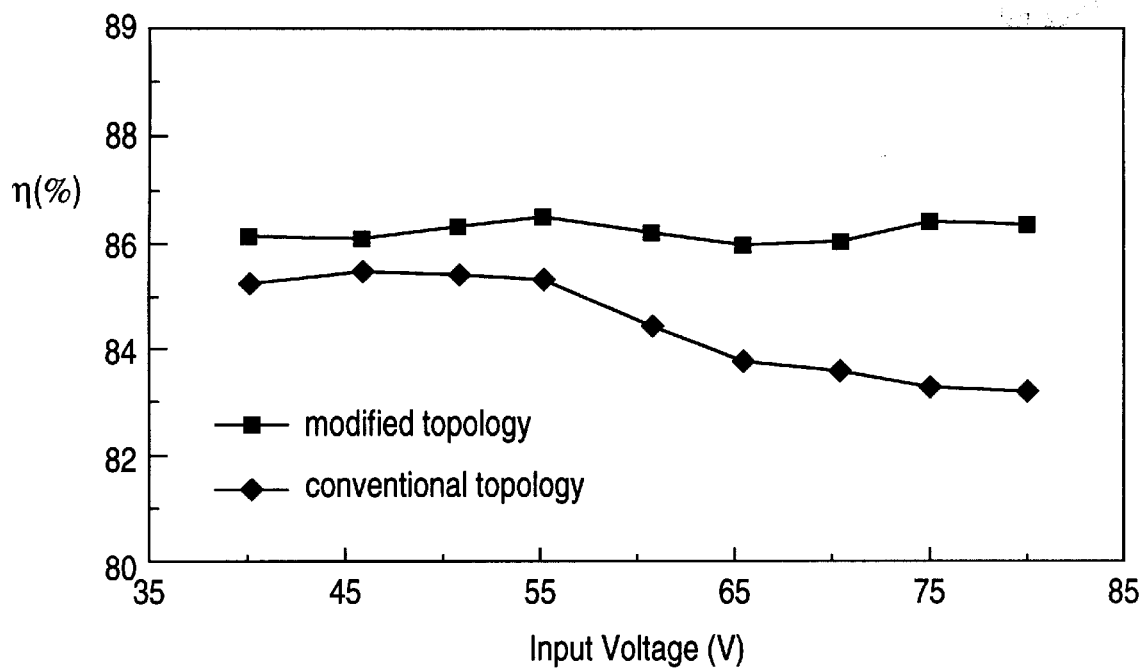
FIG. 8 is a graph comparing the operational efficiency of a conventional asymmetrical pulse width modulated resonant converter and the converter of the present invention with variation of input voltage.

FIG. 8 is a graph comparing the operational efficiency of a conventional asymmetrical pulse width modulated converter and the converter of the present invention. As shown in FIG. 8, the efficiency of the converter of the present invention is higher than that of conventional converters. This is particularly true at higher voltages where the efficiency of conventional converters begin to fall at input voltages above 55 V. In contrast, the efficiency of the converter of the present invention is consistently maintained at about 86% throughout the entire voltage range.

Figure 9:
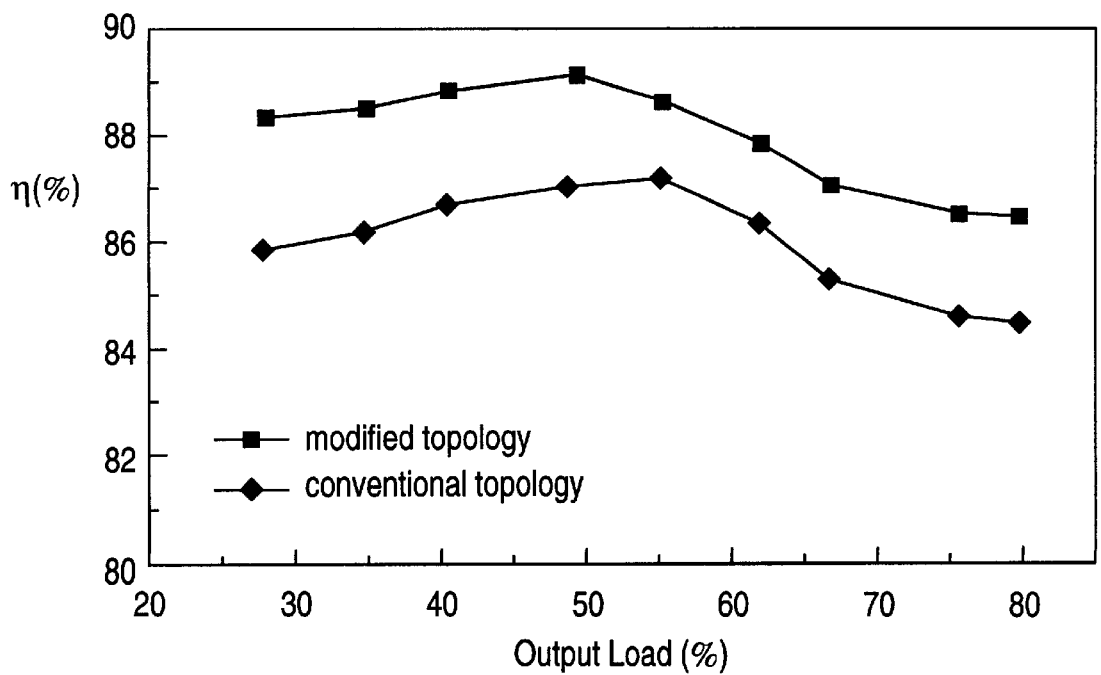
FIG. 9 is a graph comparing the operational efficiency of a conventional asymmetrical pulse width modulated resonant converter and the converter of the present invention with variations of output load.

FIG. 9 is a graph comparing the operational efficiency of a conventional asymmetrical pulse width modulated converter and the converter of the present invention in relation to variations in load current. As shown in FIG. 9, the converter of the present invention is consistently about 2% more efficient than the conventional asymmetrical converter throughout the output load range.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment disclosed, and that various changes and modifications are possible in light of the above teaching. Accordingly, the scope of the present invention is to be defined by the appended claims.

What is claimed is:

1. An asymmetrical pulse width modulated converter, comprising:
   a chopper circuit operative to convert a DC input signal to an AC signal of a high frequency, said chopper circuit including two switches, each having a snubber capacitor coupled there-across, said switches being alternately made conducting by respective gate pulse signals applied thereto, said gate pulse signals having complementary duty cycles;

a compensation network, coupled to said chopper circuit, operative to provide zero voltage switching of said two switches, said compensation network including a first auxiliary capacitor coupled in series with a second auxiliary capacitor, the series connected auxiliary capacitors coupled between the input signal and said two switches, and an inductive element coupled to a center point between the series connected auxiliary capacitors and a center point between said two switches;

a resonant circuit, coupled to said chopper circuit, said resonant circuit sending said high frequency AC signal to a transformer, said transformer providing a secondary AC signal; and a rectifier circuit, coupled to said transformer, said rectifier circuit operative to generate a stable DC output signal in response to said secondary AC signal.

2. The converter of claim 1, further including means for filtering said DC output signal.

3. The converter of claim 2, wherein said resonant circuit further comprises a capacitor in series communication with an inductor.

4. The converter of claim 1, wherein said compensation network further includes a first capacitor in series communication with a second capacitor, and an inductor coupled between the center point of said first capacitor and said second capacitor.

5. The converter of claim 4, wherein said compensation network operates to provide for zero voltage switching over a broad input signal range.

* * * * *